United States Patent [19]

Williamson

[11] 4,095,154

[45] June 13, 1978

[54] REGENERATIVE BRAKING SYSTEM FOR A CHOPPER CONTROLLED ELECTRIC TRACTION MOTOR

[75] Inventor: Dennis F. Williamson, Erie, Pa.

[73] Assignee: General Electric Company, Erie, Pa.

[21] Appl. No.: 744,591

[22] Filed: Oct. 18, 1976

[51] Int. Cl.² ............................................. H02P 3/14
[52] U.S. Cl. ..................................... 318/376; 318/381
[58] Field of Search ............... 318/381, 379, 380, 375, 318/376

[56] References Cited

U.S. PATENT DOCUMENTS 3,818,296   6/1974   Torii ..................................... 318/376

Primary Examiner—Robert K. Schaefer
Assistant Examiner—Leonard W. Pojunas, Jr.
Attorney, Agent, or Firm—J. H. Beusse

[57] ABSTRACT

A highly regenerative electrical brake control system including a variable time ratio power conditioning circuit for regulating braking effort of a direct current electric traction motor in a traction vehicle. The system includes a plurality of switches adapted for connecting the power conditioning circuit in a series path between the motor and a power source during high speed braking whereby the power conditioning circuit steps-down the motor generated voltage magnitude to match the power source voltage magnitude without using series connected resistors for voltage dropping. During low speed brake the switches are effective to reconnect the power conditioning circuit in a shunt arrangement with the motor whereby the motor voltage magnitude may be stepped-up to match the higher voltage magnitude of the power source. In a further embodiment provision is made for blending of dynamic and regenerative electrical braking when the power source is not totally receptive to motor generated current.

29 Claims, 6 Drawing Figures

REGENERATIVE BRAKING SYSTEM FOR A CHOPPER CONTROLLED ELECTRIC TRACTION MOTOR

BACKGROUND OF THE INVENTION

The present invention relates to control systems for direct current electric motors and, more particularly, to an improved control system for regenerative braking of a direct current electric motor.

Direct current (d-c) electric motors are often used in traction vehicle drive applications such as, for example, electric locomotives or transit cars. In such applications motive power is controlled by regulating motor current, typically by means of a control system employing a chopper. The chopper is essentially a controlled switch connected in the energizing circuit of the motor armature so as to meter current to the motor by periodically opening and closing. The ratio of the closed time of the chopper to the sum of the closed time and the open time is the duty factor of the chopper. During the closed period of the chopper, the motor armature windings are connected to a power source through a path of relatively low resistance and current builds toward some peak value. During the open period of the chopper, the motor is disconnected from the power source and armature current, circulating through a free wheeling diode, decays from the magnitude attained during the chopper closed time. In this manner, pulses of current are periodically applied to the motor and an average motor current is established. The average motor current tends to remain relatively constant due to the smoothing action of the circuit inductance. In general, the circuit inductance is sufficient to smooth the pulsating current and prevent jerking or lurching of the vehicle so long as the current pulses are supplied at relatively frequent repetition rates, such as for example, 200 to 400 Hz.

An advantage of the d-c electric motor for traction vehicle drives is that the motor may be operated in an electrical retarding or braking mode, when it is desired to decelerate or stop the vehicle, by simply reversing either the direction of field current or the direction of armature current. Generally this reversal is achieved by means of electromechanical contactors, although some recently developed systems have utilized static switching elements. Assuming that the motor has been propelling the vehicle so that an appreciable initial velocity of the vehicle has been achieved, reversal of the field current or reversal of the armature polarity will result in a reversal of power flow and the motor will operate as a d-c generator converting the kinetic energy of the vehicle into electrical energy.

Two types of electrical braking are commonly employed in electrically driven vehicles. These two types are dynamic braking and regenerative braking. In dynamic braking the electrical energy generated by the d-c motor is dissipated in braking resistors which convert it to thermal energy. In regenerative braking the electrical energy is returned to the power source. In vehicles such as electric locomotives or transit cars where electrical power is supplied from an external source, regenerative braking is limited by the receptivity of the external source. For example, rail gaps frequently occur and result in an open circuit between the vehicle and the power source. For this reason, many systems using electrical braking employ a combination of dynamic and regenerative braking and include a control system for blending the two types of electrical braking. Such a blending system is shown, for example, in U.S. Pat. Nos. 3,876,920 and 3,657,625. As illustrated in these patents, the chopper is connected in a shunt arrangement with the motor armature during braking and is used primarily to step-up armature current during low-speed braking.

The chopper control system of these prior art systems operates in the braking mode in a manner similar to the operation in the propulsion mode, i.e., braking torque is regulated by using the chopper to control the average armature current. In a typical traction vehicle system the electrical braking power required may be two to three times the motoring power resulting in the armature generated voltage being two or three times the magnitude of the source voltage. Under this condition it is clear that the motor armature cannot be connected directly to the voltage source during regenerative braking since the difference in potential would result in excessive currents flowing from the motor to the source. Such currents could result in permanent damage to the motor armature if "flashing" were to occur. Accordingly, series resistors are commonly inserted in the motor current path during regenerative braking. However, the series resistors dissipate the regenerative energy and prevent full energy recapture.

In a traction vehicle system using plural motors wherein the motors are arranged to be connected in series across a power source during motoring, an alternative arrangement is to reconnect the motors into a parallel configuration during braking. This arrangment effectively reduces the voltage reflected to the power source but creates an additional current handling problem since the regenerative current is increased by the same factor as by which the voltage is decreased. This necessitates a chopper size increase in proportion to the increase in current. The required increase in chopper size makes this arrangment economically unattractive.

In a system having high regenerative capability, the receptivity of the power source is of great concern. A preferred method for guaranteeing electric braking is to incorporate dynamic braking capability in the vehicle and to provide control means to effect electrical brake blending. However, because the power conditioning means in a highly regenerative system is connected in both a series and parallel configuration during electrical braking, the blending circuits of the prior art do not adequately function in the present system.

OBJECT OF THE INVENTION

It is an object of the present invention to provide a more economical regenerative braking system for a chopper controlled d-c electric motor.

It is a further object of the present invention to provide a regenerative braking system which increases the available regenerative energy without necessitating increased chopper size.

It is a further object of the present invention to provide a regenerative braking system which obviates the need for series braking resistors for voltage matching.

It is a still further object of the present invention to provide an improved regenerative braking system with dynamic brake blending.

SUMMARY OF THE INVENTION

In accordance with the present invention there is provided a time ratio controlled thyristor power circuit including a main thyristor and associated commutating circuits for a direct current electric traction motor. The power circuit includes a plurality of switches which are operable during electrical braking to connect the main thyristor in series circuit arrangement with the motor and the power source when armature generated voltage is high and in parallel circuit arrangement with the motor and the power source when armature generated voltage is low. In the series circuit arrangement the main thyristor is operated as a series voltage step-down switch. The duty factor of the thyristor directly regulates armature current. When the thyristor is non-conductive, armature current is stored in a filter capacitor. When the main thyristor is conducting, the motor armature and filter capacitor supply current to the power source through the main thyristor. In the parallel circuit arrangement the motor armature is connected to the power source through an inductor and the main thyristor is operated as a shunt switch in a voltage step-up configuration which periodically short circuits the motor armature in order to maintain armature current at the desired magnitude.

In a preferred embodiment the inventive power circuit includes dynamic brake resistors and associated switching thyristors for selectively connecting the brake resistors in a motor current path. By appropriately controlling the conduction ratio of the thyristors, the effective resistance of the resistors may be varied whereby electrical brake blending is attained.

BRIEF DESCRIPTION OF THE DRAWINGS

These and other objects, features and advantages of this invention can be better understood by reference to the following detailed description when considered in conjunction with the accompanying drawings in which.

DETAILED DESCRIPTION

Figure 1:
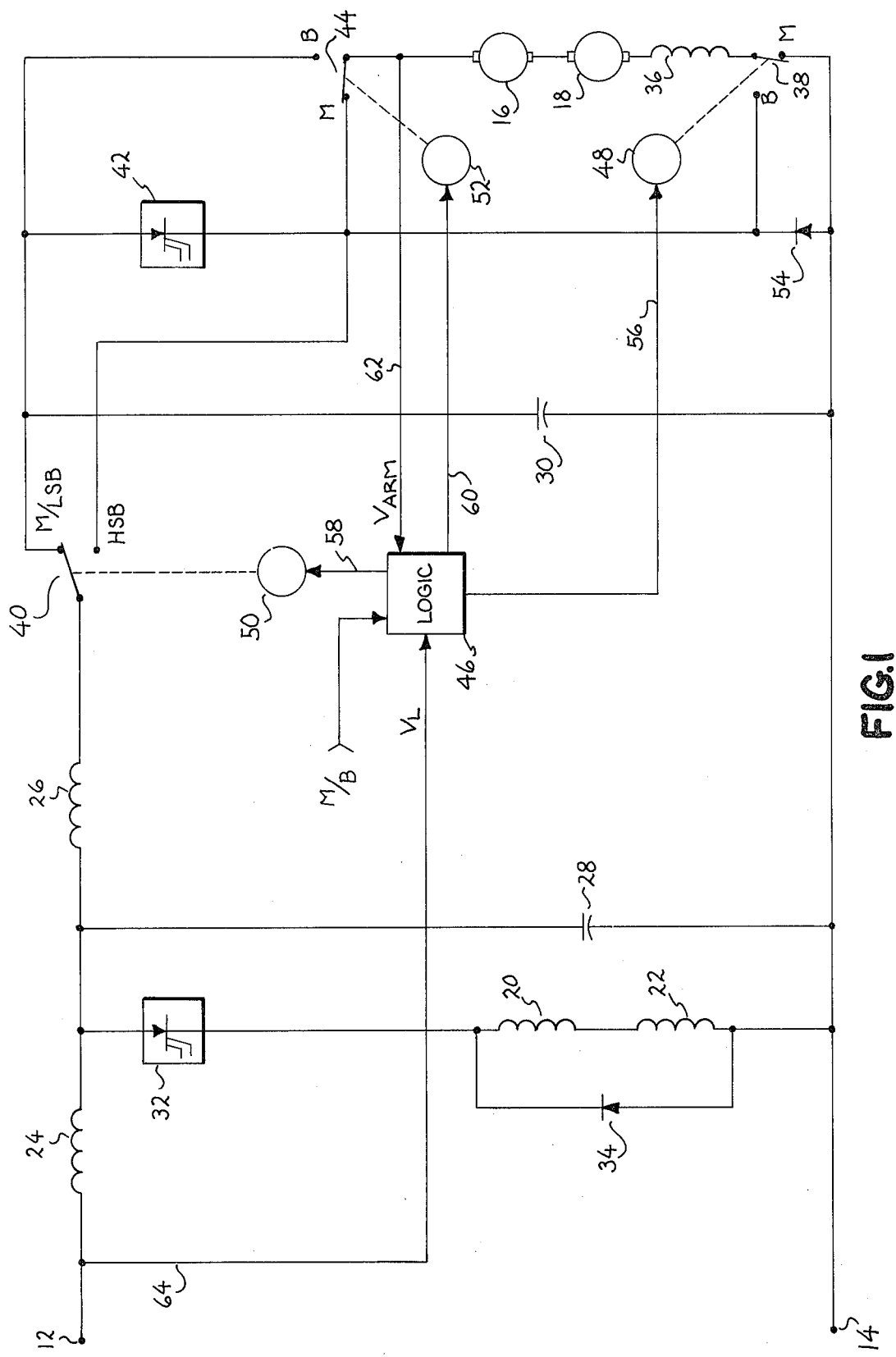
FIG. 1 is a partial schematic diagram of a d-c electric traction motor power control system according to the present invention.

Referring now to FIG. 1 there is shown a simplified schematic and block diagram of a variable time ratio power control system for a d-c electric traction motor incorporating the teachings of the present invention. Power for the motor control system is supplied from a power source (not shown) by means well known in the art which connect the power source to first and second source terminals 12 and 14, respectively. For purposes of discussion source terminal 12 will be referred to as a positive voltage terminal and source terminal 14 will be referred to as a negative source terminal. Power is supplied from terminals 12 and 14 to a pair of traction motors including armatures 16 and 18 and field windings 20 and 22, respectively. As can be seen the motors are connected as separately excited machines with the field windings being serially connected in one current path and the armature windings being serially connected in a second current path.

The power circuit includes a two section line filter comprising first and second inductors 24 and 26 and first and second capacitors 28 and 30. A first line filter section comprising inductor 24 and capacitor 28 is connected between source terminal 12 and 14, and a second line filter section comprising inductor 26 and capacitor 30 is connected in parallel with capacitor 28. Motor field windings 20 and 22 are serially connected to a variable time ratio control circuit or chopper 32 which regulates current through the two fields. The combination of fields 20 and 22 and chopper 32 is serially connected between terminal 14 and a junction intermediate inductor 24 and capacitor 28. A free wheeling diode 34 is connected in parallel with fields 20 and 22 in order to provide a current path during the non-conducting time of chopper 32. Chopper 32 may be of the type well known in the art such as that described in the General Electric SCR Manual, Fifth Edition, published in 1972 by the General Electric Company, Semiconductor Products Department, Schenectady, N.Y. Circuits for controlling the operation of chopper 32 are well known in the art and are described in the aforementioned GE SCR Manual and in addition in U.S. Pat. No. 3,866,098 — Weiser issued Feb. 11, 1975 and assigned to the General Electric Company.

Motor armatures 16 and 18 are serially connected to source terminal 14 through a motor smoothing reactor 36 and a power switch 38. During motoring, i.e., when the motors are being used to propel the vehicle, power is supplied to armature 16 and 18 via the filter reactors or inductors 24 and 26, a first power switch 40, a variable time ratio control circuit or chopper 42, and a second power switch 44. Chopper 42 may be identical to the previously described chopper 32. The switches 38, 40, and 44 are effective to connect armatures 16 and 18 into either a series or parallel configuration with respect to chopper 42 and to connect chopper 42 to conduct current either from or to the motor armatures. Control of switches 38, 40, and 44 is effected by logic circuit 46 which is responsive to selected circuit parameters and operator's commands to apply control signals to switch actuators 48, 50, and 52 which control, respectively, switches 38, 40, and 44.

The power control system illustrated in FIG. 1 is shown in a motoring mode wherein power is supplied from source terminal 12 through inductor 24, inductor 26, switch 40, chopper 42, and switch 44 to armatures 16 and 18. Armature current is regulated by chopper 42, which chopper functions in a manner well known in the art to meter power to the traction motor armatures 16 and 18 by periodically opening and closing. During the closed time of chopper 42, current circulates in a closed path through motor reactor 36, switch 38, free wheeling diode 54 and switch 44 back through armature 16 and 18. By appropriately regulating the ratio of the conducting time of chopper 42 to its non-conducting time the average level of armature current in armature 16 and 18 can be controlled. Similarly, the average current in field windings 20 and 22 may be controlled by regulating the conduction ratio of chopper 32.

As is well known the duty factor of chopper 32 may be maintained at a relatively high percentage to maximize flux and torque in the associated motors until armature rotational velocity reaches a motor base speed or corner point. Above base speed, maintaining a high field current causes armature counter electromotive force (CEMF) to increase to such a level that armature current is decreased thus resulting in reduced motor torque. To combat this situation the duty factor of chopper 32 is reduced when the motors are operated above base speed thereby tapering field current and allowing motor speed to increase above base speed without substantial loss of torque.

Figure 4:
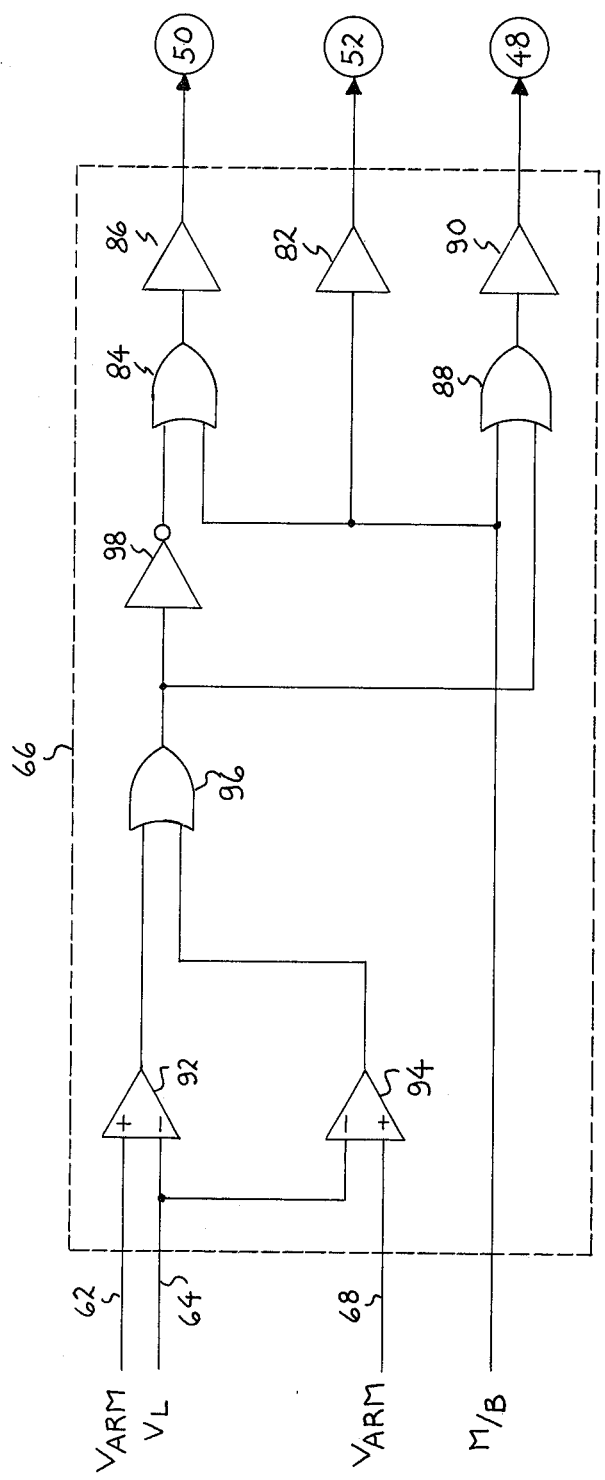
FIG. 4 is a simplified block diagram of a logic circuit for use with the present invention.

When electrical braking is initiated at high motor speeds the torque effort to be generated by the motor usually requires that the motor be operated at full field current. However, operation of the motor at high speeds with full field current results in a high CEMF being developed by the motor armatures. In order to accommodate the higher generated armature voltage without the necessity of having to utilize series resistors to absorb the voltage differential, the present invention provides a means for reconnecting the chopper 42 into a series circuit arrangement with armatures 16 and 18 whereby the chopper may be utilized to step down the armature voltage and regulate armature current to a desired level. In particular, this function is accomplished by logic circuit 46 which receives a motor brake command M/B and provides signals to control the braking switches 38, 40, and 44. Logic circuit 46 may be readily implemented in various ways by persons having ordinary skill in the art. An exemplary logic circuit is shown in FIG. 4 to be described hereinafter. For purposes of understanding the present invention it is sufficient to describe logic circuit 46 in functional terms. In particular logic circuit 46 includes logic gates which are enabled in response to a positive voltage signal on the M/B input lead, i.e., a command signal indicating that the propulsion system is to be operated in a motoring mode rather than a braking mode. This enablement provides energizing output signals which are applied via lines 56, 58, and 60 to switch actuators 48, 50, and 52, respectively. These energizing output signals are effective to position the switches 38, 40, and 44 in the illustrated positions, i.e., in the motoring conditions. It will be apparent, therefore, that a loss of command signal which may occur, for example, due to a loss of power, will result in removal of the energizing signals and cause each of the switches 38, 40, and 44 to revert to a rest position in which the circuit is configured for electrical braking.

When the system is commanded to a braking mode, switch actuators 48 and 50 are energized by logic circuit 46 in response to a comparison of the magnitude of generated armature voltage $V_{arm}$ on line 62 to the magnitude of source voltage $V_L$ at terminal 12 supplied via line 64. Switch actuator 52 is energized in direct response to the M/B command signal and therefore reverts to the brake (B) position as soon as the motoring command is terminated. If the comparison of $V_{arm}$ to $V_L$ indicates that $V_{arm}$ is greater than $V_L$, the energizing signal on line 58 to switch actuator 50 is inhibited causing switch 40 to move to the high speed brake (HSB) position. Since the armature CEMF exceeds line voltage, current reverses through the armature and flows through switch 44, chopper 42, and switch 40 back through the inductors 24 and 26 into the source connected at terminal 12. The magnitude of current produced by armatures 16 and 18 and supplied to terminal 12 is regulated by varying the duty factor of chopper 42. During the off time or non-conducting time of chopper 42, current from armatures 16 and 18 continues to flow and is stored in capacitor 30. Accordingly, when chopper 42 is gated into conduction, the armatures 16 and 18 and the capacitor 30 operate as current sources forcing current through chopper 42, switch 40 and the inductors 24 and 26 back to the power source connected to terminal 12. When the armature generated voltage has fallen to less than line voltage as determined by logic circuit 46, the energizing signal will again be supplied to actuator 50 to cause switch 40 to move to the motor and low speed brake position (M/LSB). At this same time the energizing signal to switch actuator 48 will be inhibited causing switch 38 to move into the brake (B) position. The effect of moving switches 38 and 40 is to connect chopper 42 in parallel circuit arrangement with the series combination of armatures 16 and 18 and to essentially connect armatures 16 and 18 between the positive and negative power busses associated with terminals 12 and 14, respectively. Since the armature generated voltage is less than line voltage during low speed brake, the system operates as a flyback system to build current to a high level and then remove the short circuit thereby forcing current to be transferred into a higher voltage source. This method of transfer is commonly referred to as a voltage step-up chopper arrangement. In particular, chopper 42 is gated on to cause current to build up quickly in the closed loop around the armature and chopper circuit through switches 44 and 38. The chopper 42 is then turned off and current, because of the inductive nature of the circuit and because the current is unable to propagate through the closed loop path of chopper 42, continues to circulate through switch 40 and inductors 24 and 26 back to the power source connected to terminals 12 and 14. The closed loop is completed by a current path from terminal 14 through diode 54 and motor reactor 36 back to armatures 16 and 18.

As can be seen the inventive circuit contemplates a system in which, during high speed braking operation when the armature generated voltage exceeds the magnitude of the voltage appearing at terminals 12 and 14, the chopper is connected in a series arrangement to effect a voltage step down and therefore regulate the amount of braking torque at the desired level by regulating regenerative current. Correspondingly, when the armature generated voltage is less than the magnitude of voltage appearing at terminals 12 and 14, the chopper is reconnected in a parallel configuration and operates as a voltage step-up chopper to force current to flow from the lower magnitude of armature generated voltage to the higher magnitude of source voltage thus maintaining regenerative electrical braking. In both configurations the motor armatures are connected to supply current without the need for voltage or current limiting resistors.

Figure 2:
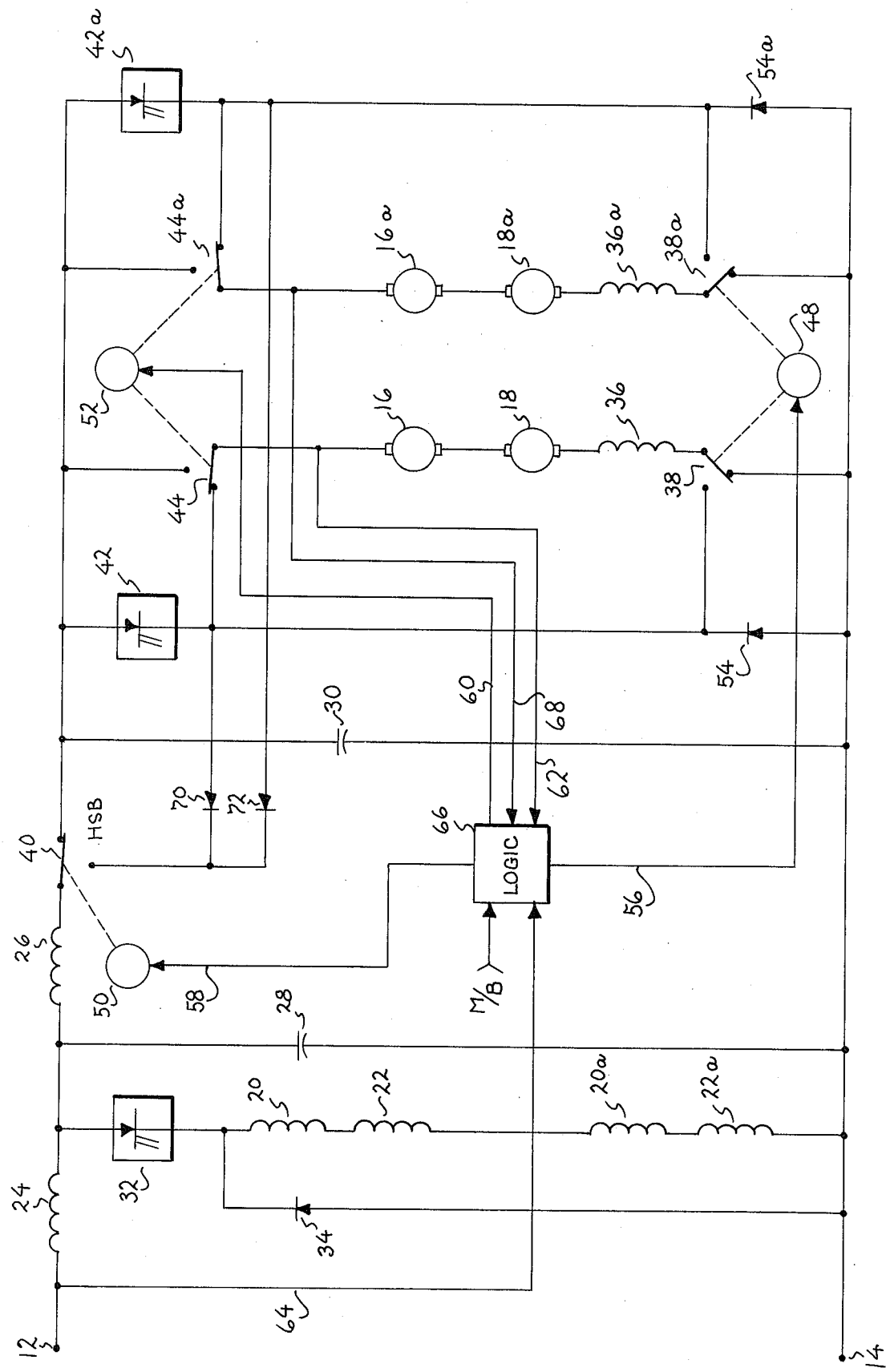
FIG. 2 is a modified form of the schematic diagram of FIG. 1 extended to a two series, two parallel traction motor arrangement.

Referring now to FIG. 2 there is shown a modification of the circuit of FIG. 1 in which the motors are arranged in a two series, two parallel arrangement. To simplify an understanding of the modification, additional elements which correspond to elements previously described and which operate in a corresponding manner are identified with the number of the corresponding element followed by a suffix. For example, the additional parallel pair of motor armatures are identified as armatures 16a and 18a and will be understood to be identical to armatures 16 and 18. Switch actuators 48 and 52 are identical but switches 38 and 44 each have an additional set of contacts 38a and 44a, respectively. In addition, a field winding 20a is also associated with armature 16a and a field winding 22a is associated with armature 18a. Logic circuit 66 is a modification of the previously described logic circuit 46 which includes an additional feature for comparing the $V_{arm}$ voltages on lines 62 and 68 developed at the armatures 16 and 16a, respectively, and for producing a $V_{max}$ signal which is a function of the largest of the armature voltages appearing at the positive voltage terminals of either armature 16 or armature 16a. This $V_{max}$ signal is compared with the $V_L$ line voltage signal to produce the switch energizing signals as described previously with respect to FIG. 1. A further modification involves the summation of the outputs developed at the current output terminals of chopper circuits 42 and 42a. This summing function is produced by connecting a first diode 70 between the output terminal of chopper 42 and the HSB contact of switch 40 and by connecting a second diode 72 between the output terminal of chopper 42a and the HSB terminal of switch 40.

As a general rule it is well known in the art that when parallel choppers are used to supply parallel armature networks from a common source the choppers are staggered fired, i.e., only one chopper is fired at any given instance. During electrical high speed braking when one of the choppers 42 or 42a is fired, the current is conducted from both sets of parallel connected armatures 16 and 18 and 16a and 18a through the chopper which is conducting and its associated diode 70 or 72 back through the switch 40 and to the source terminal 12. During the time period when both chopper 42 and 42a are non-conductive the energy or current generated by the armatures 16, 18, 16a, and 18a is stored in capacitor 30. Accordingly, with the exception of the stagger firing of two separate choppers the operation of the circuit of FIG. 2 is identical to the operation of the circuit of FIG. 1.

To better understand the operation of the power circuit in FIG. 2, assume that the terminal voltage across motor armatures 16 and 18 and armatures 16a and 18a during high speed electrical braking is approximately twice the average line voltage appearing between terminals 12 and 14. If it is then desired to initiate a braking effort which requires an average armature current of magnitude I to be produced by each series pair of armatures, a total average current of magnitude 2I will then be produced by the four motor armatures. If the voltage between the terminals 12 and 14 is of a magnitude V, then under the assumed conditions the voltage appearing across the motor armatures will be of magnitude 2V. Accordingly, it can be seen that the power being developed by the motor armatures is equal to 4VI and that this same amount of power must be delivered to the source connected to terminals 12 and 14. Since the voltage at terminals 12 and 14 has a magnitude V, the current which is delivered to these terminals must be of magnitude 4I. Thus each time that one of the chopper circuits 42 is gated into conduction a current of magnitude 4I will flow through the chopper 42 and the inductor 26 to the terminal 12 for ¼ of a chopping cycle. During the non-conducting time of the choppers 42 and 42a current will continue to flow due to the inductive nature of inductance 26 but will follow a path which includes the free wheeling diodes 54 and 54a and the diodes 70 and 72 back to the source 12. The circuit of FIG. 2 therefore requires that each of the choppers be capable of commutating a current having a peak magnitude of 4 times the normal line current in order to accommodate the desired braking effort during electrical braking. The average current per chopper will be I due to the time ratio of chopping, i.e., ¼ cycle of conduction multiplied by 4I magnitude of current during conduction.

Figure 3:
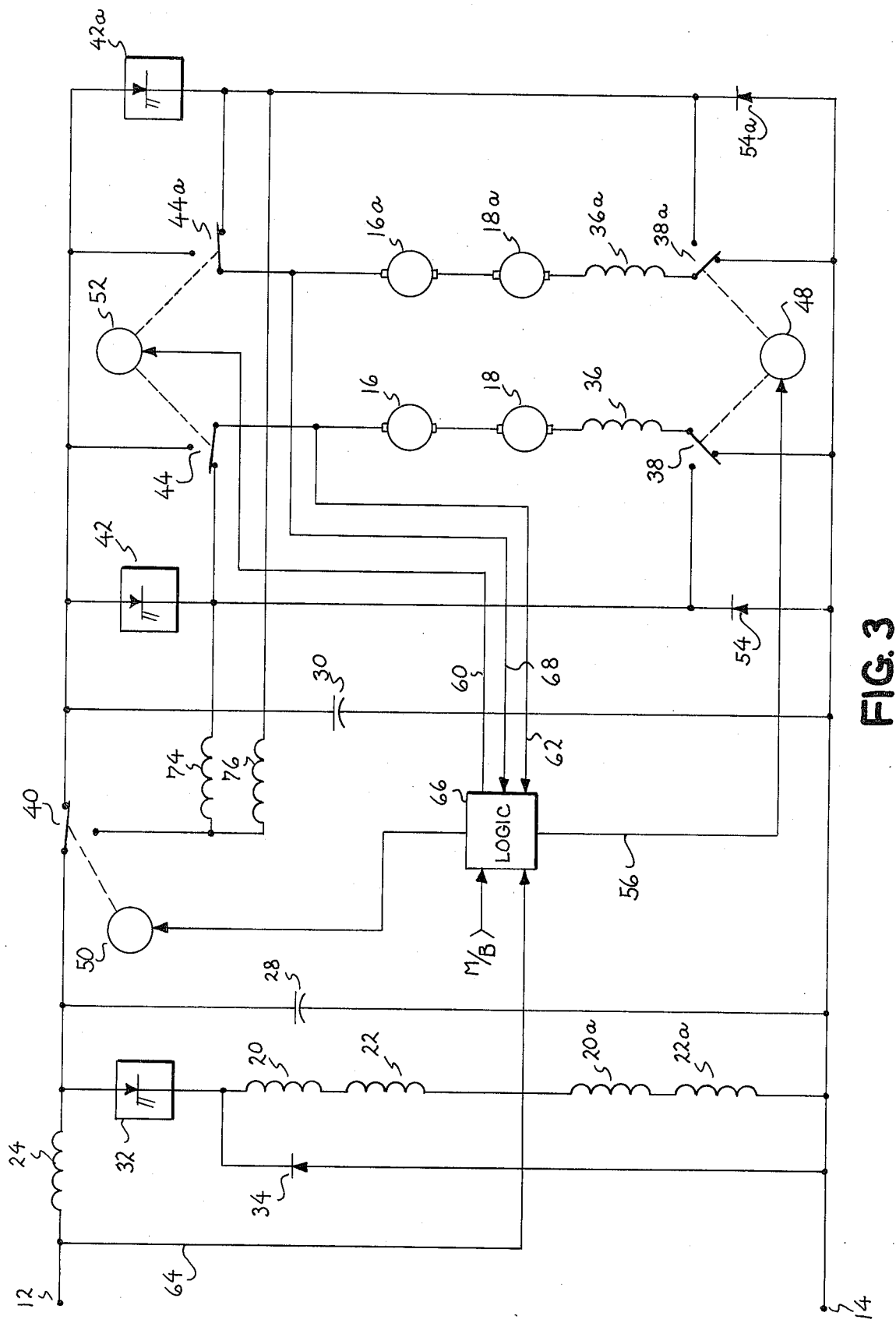
FIG. 3 is a further modification of the diagram of FIG. 2.

Referring now to FIG. 3, there is shown a preferred form of the inventive regenerative braking system in which the inductor 26 has been replaced by two inductors 74 and 76 and the diodes 70 and 72 have been deleted. In the system of FIG. 3 during electrical braking, again assuming that the power developed by the four motors is equivalent to 4VI where the net regenerated motor current is 2I and the total armature voltage is 2V, each of the chopper circuits 42 and 42a is only required to commutate a current equivalent to 2I. However, the duty factor of the chopper circuits will be increased to 50% rather than 25% as was used in the circuit of FIG. 2. With a 50% duty factor one of the choppers is on at least half the time. During one half-cycle current of magnitude 2I will flow through chopper 42, inductor 74, and into the terminal 12. When chopper 42 turns off, however, current will continue to flow through the conductor 74 at essentially the same magnitude as it was flowing during the on time of chopper 42. During the off time of chopper 42, chopper 42a will be gated into conduction and current will flow through this latter chopper and its series connected inductor 76 adding additional current equivalent to a magnitude 2I to that current flowing through inductor 74. Accordingly, the total current flowing into terminal 12 will be the sum of that current through inductor 74 and inductor 76, i.e., a current of a magnitude 4I. The advantage of this circuit is the fact that each of the choppers is only required to commutate a current magnitude of 2I rather than an instantaneous current magnitude of 4I as was required in the circuit of FIG. 2. In addition to the advantages of operating with lower current, the circuit of FIG. 3 also places less stress on the commutation circuit for the choppers 42 and 42a. As is well known, the ability of a chopper to be commutated depends upon the available terminal voltage and the amount of current which the chopper is conducting. With a current of 4I, more commutation energy is required to turn off the chopper than is required when the chopper is only carrying a current of magnitude 2I. With regard to this commutation aspect it is noted that during braking the terminal voltage of 2v is sufficiently above the normal working terminal voltage of V during propulsion so that there is sufficient energy available to adequately commutate the chopper running at a current magnitude of 2I. Since the chopper design in a traction vehicle application requires current and voltage capability of at least twice nominal current and voltage in order to accommodate normal line transients, no significant design changes are required in choppers 42 and 42a in order for them to be capable of being reconnected as a series chopper during electrical braking. However, it is necessary to add the additional capacitor 30 in order to provide a current sink during the non-conducting interval of the choppers.

Referring to FIG. 4 there is shown a simplified schematic of logic circuit 66. For purposes of ease of understanding, the circuit 66 is presented without illustration of various voltage dropping and biasing resistors, such elements and their utilization being well known in the art. During motoring the M/B command signal is a logic 1 (positive voltage) signal and is applied through non-inverting driver amplifier 82 to switch actuator 52, through OR gate 84 and non-inverting driver amplifier 86 to switch actuator 50 and through OR gate 88 and non-inverting driver amplifier 90 to switch actuator 48. Thus, each switch actuator 48, 50, and 52 is energized in response to a motoring command.

When brake is initiated, the M/B signal becomes a logic 0 thereby removing energization from switch actuator 52 and from OR gates 84 and 88. As can be seen, the $V_L$ signal on line 64 is applied to the inverting input terminals of comparators 92 and 94. The non-inverting input terminal of comparator 92 is connected to receive the $V_{arm}$ signal on line 62 and the non-inverting input terminal of comparator 94 is connected to receive the $V_{arm}$ signal on line 68. An output terminal of comparator 92 is connected to a first input terminal of OR gate 96 and an output terminal of comparator 94 is connected to a second input terminal of OR gate 96. The output terminal of OR gate 96 is connected to a second input terminal of OR gate 88 and, through an inverter 98, to a second input terminal of OR gate 84. Accordingly, if either of the $V_{arm}$ voltages is greater than the $V_L$ voltage, a positive voltage signal or logic 1 signal will be supplied to one of the input terminals of OR gate 96 and will result in a logic 1 signal being developed at an output terminal of OR gate 96. This signal will be applied through OR gate 88 and driver amplifier 90 to maintain energization of switch actuator 48. However, due to inverter 98, this signal will be inhibited before application to switch actuator 50 and will result in de-energization of actuator 50 and cause switch 40 to move to the HSB position. When both $V_{arm}$ signal levels are less then the $V_L$ signal level, the comparators 92 and 94 will provide logic 0 signals which will then result in switch actuator 50 being energized and switch actuator 48 being deenergized.

Figure 5:
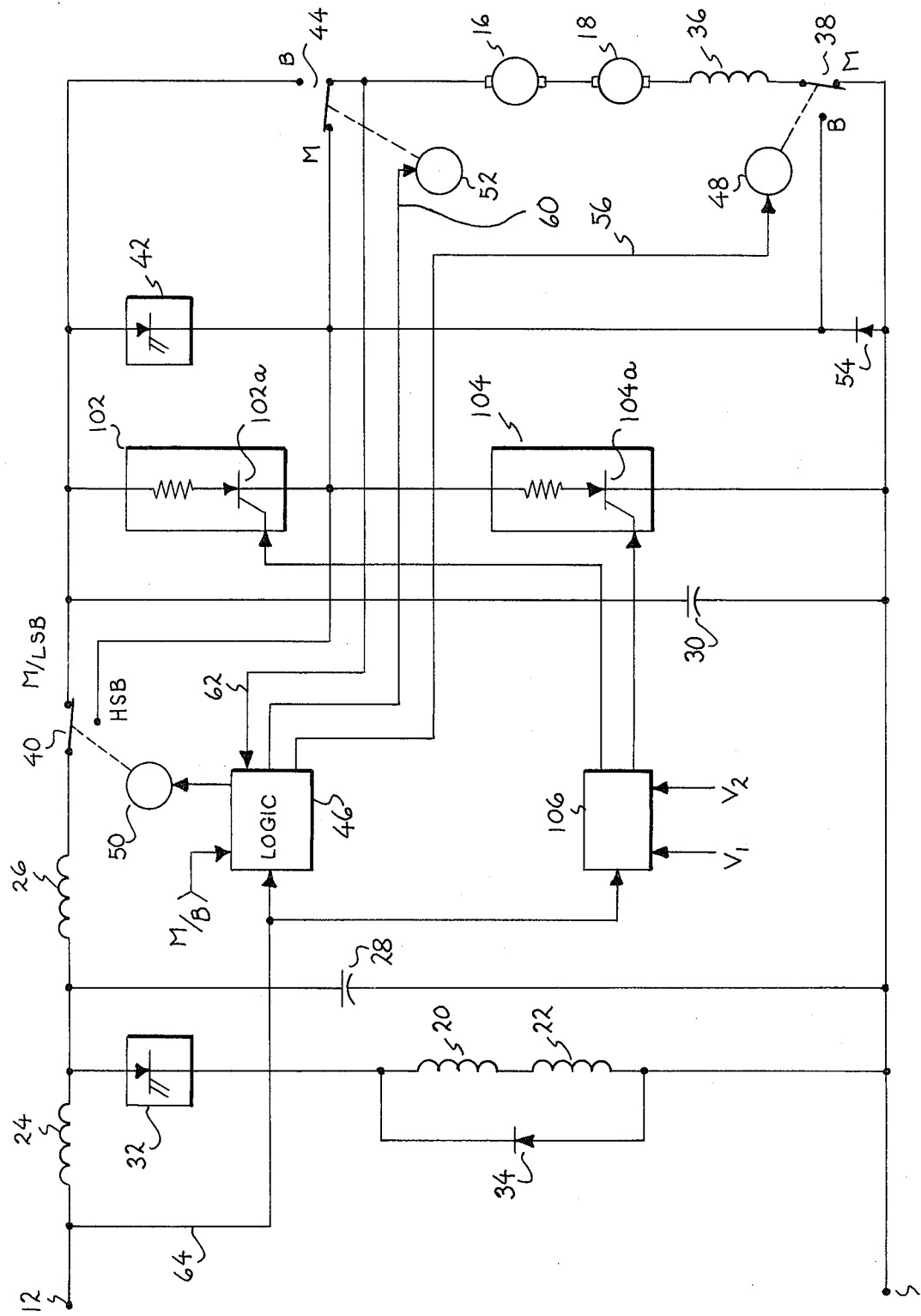
FIG. 5 is a modified form of the schematic diagram of FIG. 1 incorporating electrical brake blending.

Referring now to FIG. 5 there is shown a modified form of FIG. 1 incorporating controllable dynamic brake circuits 102 and 104. Brake circuit 102 is connected in parallel circuit arrangement with chopper 42 and brake circuit 104 is serially connected between brake circuit 102 and source terminal 14. In a preferred embodiment brake circuits 102 and 104 each comprise a power resistor and serially connected thyristor, although other modifications such as, for example, plural resistors and thyristors or mechanical switching arrangements may also be utilized. A control circuit 106 responsive to the implementation of electrical braking and to the receptivity of the power source at terminals 12 and 14 supplies control signals to selectively energize braking circuits 102 and 104. Where thyristors are utilized as switching elements, time ratio control of the thyristors will provide uniform variation of dynamic brake resistance for implementing electrical brake blending. Circuits such as 106 for providing gate pulses to thyristors to effect time ratio control are well known in the art and are described, for example, in the aforementioned GE *SCR Manual*. Examples of circuits suitable for determining receptivity of a power source are described and claimed in a co-pending application of A. B. Plunkett, Ser. No. 713,491, filed Aug. 11, 1976 and assigned to the General Electric Company. Alternately, rather than determining receptivity control circuit 106 may be adapted to compare the voltage magnitude developed on capacitor 30 to predetermined reference voltage magnitudes. A first magnitude $V_1$ may be selected to be a magnitude slightly higher than the maximum voltage magnitude expected to be available from the power source. A second magnitude $V_2$ may be selected to be somewhat higher than the first magnitude $V_1$. In the high speed brake mode of operation where the chopper 42 is connected as a series step-down chopper between the motor armatures 16 and 18 and the source terminal 12, brake circuit 104 is essentially in parallel circuit arrangement with the power source at terminals 12 and 14 and thus serves as the primary means for controlling the apparent "load" impedance reflected to the current regenerating armatures 16 and 18. However, brake circuit 102 may also be utilized during high speed brake by simultaneously energizing both brake circuit 102 and 104. This latter action will result in the series combination of brake circuit 102 and brake circuit 104 being connected in parallel circuit arrangement with armatures 16 and 18 thereby providing a dynamic brake current path which may be utilized if the power source at terminals 12 and 14 approaches or attains the total non-receptivity.

In the HSB mode, control circuit 106 compares the voltage magnitude $V_L$ at terminal 12 to the reference voltage $V_1$ and, if $V_L$ is greater than $V_1$, generates gating signals to energize brake circuit 104 by gating thyristor 104a into conduction. A current path will thus be formed through brake circuit 104 and regenerative energy will be thermally dissipated in the braking resistance. If the power source becomes non-receptive to the point at which the regenerative current causes the voltage $V_L$ to exceed the reference voltage magnitude $V_2$, control circuit 106 will supply gating signals to thyristors 104a and 102a simultaneously thereby energizing both braking circuits 102 and 104 and creating a current path in parallel with the armatures 16 and 18. Clearly, the braking circuits 102 and 104 may be sized to operate in a full dynamic brake mode. It is noted that the thyristors 102a and 104a are gated into conduction by control circuit 106 but that conduction of these thyristors is terminated by action of the commutation circuit inherent in chopper 42.

In the LSB mode of operation, brake circuit 102 provides electrical brake blending. It will be apparent that the LSB mode is typical of prior art electrical braking systems and that braking circuit 102 is controlled in accordance with the prior art during low speed brake operation as is illustrated in U.S. Pat. No. 3,577,055.

Figure 6:
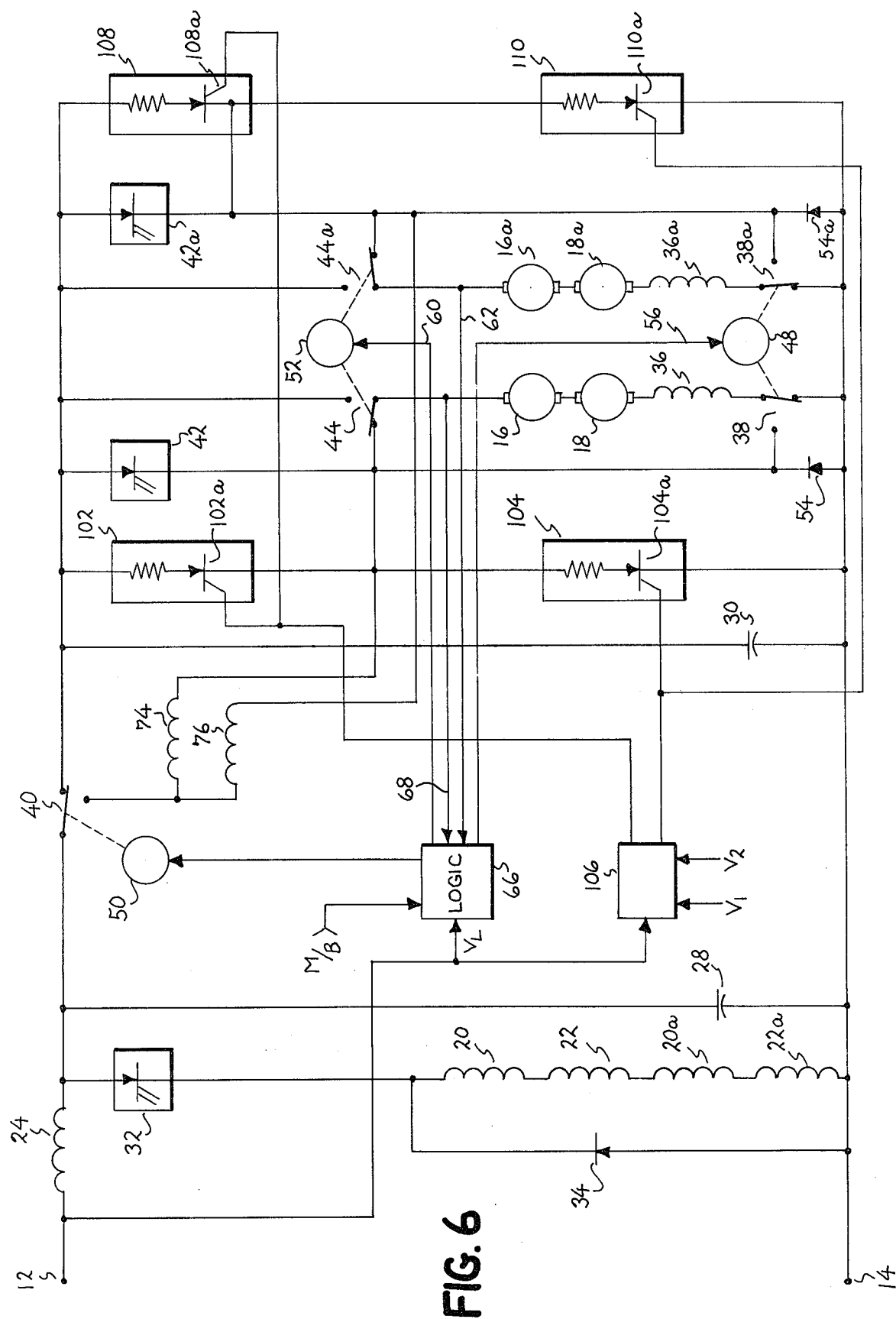
FIG. 6 is a modified form of FIG. 3 incorporating electrical brake blending.

Referring to FIG. 6 there is shown an extension of the inventive circuit of FIG. 5 as applied to the two series, two parallel traction motor power system illustrated in FIG. 3. As can be seen the addition of two traction motors 16a and 18a in a parallel current path require an additional pair of series connected brake circuits 108 and 110. The control signals supplied by control circuit 106 to brake circuits 102 and 104 are supplied to circuits 108 and 110 whereby the latter circuits function identically to circuits 102 and 104. Clearly, the addition of further motor pairs may be similarly provided with pairs of braking circuits all regulated by control circuit 106 to effect blending of regenerative and dynamic electrical braking.

As will be apparent there has been disclosed a regenerative electrical braking system which increases the regenerative energy supplied to a power source by a braking motor. Furthermore, there is described a system which eliminates the need for braking resistors for voltage matching during regenerative braking. In addition, since the inventive system is capable of regulating the armature generated current by utilizing a step down chopper effect, the system avoids the necessity of providing an oversize chopper for handling the current which would be generated by a system in which the armatures were paralleled during electrical high speed braking. Although not illustrated, it is apparent that reversal of the direction of motor drive may be implemented in the present system by, for example, providing reversing contactors to reverse the motor field winding connections.

While the principles of the invention have now been made clear in an illustrated embodiment there will be immediately obvious to those skilled in the art many modifications, constructions and arrangements used in the practice of the invention which are particularly adapted for specific environments and operation requirements without departing from these principles. The appended claims are therefore intended to cover and embrace any such modifications, subject only to the true spirit and scope of the invention.

What I claim as new and desire to secure by Letters Patent of the United States is:

1. A d-c electric traction motor control system comprising:
   a. first and second source terminals adapted for connection to a d-c power source;
   b. a first d-c electric traction motor operable in a motoring mode and in an electrical braking mode;
   c. power control means responsive to a command signal for regulating current therethrough;
   d. switch means operable during said motoring mode to serially connect said power control means and an armature of said traction motor between said first and second source terminals whereby electrical energy may be provided to said traction motor, said switch means being operable during said electrical braking mode to serially connect said power control means in a reverse direction whereby electrical energy may be transferred from said traction motor armature to said source terminals through said power control means when the terminal voltage magnitude of said traction motor exceeds the voltage magnitude at said source terminals, and said switch means being operable when said terminal voltage magnitude of said traction motor is less than said voltage magnitude at said source terminals during said electrical braking mode to connect said power control means in parallel circuit arrangement with said traction motor between said source terminals.

2. A d-c electric traction motor control system comprising:
   a. first and second source terminals adapted for connection to a d-c power source;
   b. a d-c electric traction motor operable in a motoring mode and in an electrical braking mode, said motor having first and second motor terminals;
   c. a variable time ratio power control means having a power input terminal and a power output terminal and responsive to a command signal for regulating current therethrough;
   d. first switch means connected to said first source terminal and having a first state for connecting said first source terminal to said power input terminal and having a second state for connecting said first source terminal to said power output terminal;
   e. second switch means connected to said first motor terminal and having a first state for connecting said first motor terminal to said power output terminal and having a second state for connecting said first motor terminal to said power input terminal;
   f. third switch means connected to said second motor terminal and having a first state for connecting said second motor terminal to said second source terminal and having a second state for connecting said second motor terminal to said power output terminal;
   g. unidirectional conducting means connected between said power output terminal and said second source terminal and poled to conduct current from said second source terminal to said power output terminal;
   h. energy storage means connected between said power input terminal and said second source terminal; and
   i. control means for controlling the states of said first, second and third switch means whereby said switch means are each maintained in said first states during said motoring mode and are selectively switched to said second states during said electrical braking mode.

3. The system of claim 2 and including filter means connected in series circuit relationship with said source terminals and said first switch means.

4. The system of claim 3 wherein said motor is adapted to have a separately excited field winding, the system including a second variable time ratio power control means interconnecting said field winding between said source terminals and poled to supply electrical energy of a predetermined polarity to said field winding, said second power control means being responsive to a control signal for regulating the average magnitude of current in said field winding.

5. The system of claim 4 wherein said filter means comprises:
   i. a first inductive filter reactor serially interconnecting said source terminals with said second power control means and said field winding;
   ii. a second energy storage means connected in parallel circuit arrangement with said second power control means and said field winding; and
   iii. a second inductive filter reactor interconnecting said first filter reactor with said first switch means.

6. The system of claim 5 and including:
   a. a second d-c electric traction motor operable in a motoring mode and in an electrical braking mode; and
   b. a third variable time ratio power control means having a power input terminal and a power output terminal and responsive to a control signal for regulating current therethrough, said second motor and said third power control means being connected in parallel circuit arrangement with said first motor and said first power control means.

7. A d-c electric traction motor control system comprising:
   a. first and second source terminals adapted for connection to a d-c power source;
   b. a first d-c electric traction motor operable in a motoring mode and in an electrical braking mode;
   c. controllable power conditioning means responsive to a control signal for regulating the average magnitude of current flowing in a predetermined forward direction therethrough;
   d. switch means responsive to a mode changing signal for selectively interconnecting said source terminals, the armature terminals of said motor and said power conditioning means, said switch means including:
      i. first means effective during said motoring mode for serially connecting said powering conditioning means and said motor between said source terminals with said power conditioning means poled to permit electrical energy to be supplied from said source to said motor, ii. second means effective during said braking mode and when the average magnitude of voltage across said armature terminals exceeds the average magnitude of voltage across said source terminals for serially connecting said power conditioning means and said motor between said source terminals with said power conditioning means poled to permit electrical energy to be supplied from said motor to said source, and iii. third means effective during said braking mode and when the average magnitude of voltage across said armature terminals is less than the average magnitude of voltage across said source terminals for connecting said power conditioning means in parallel circuit arrangement with said motor between said source terminals with said power conditioning means poled to conduct current generated by said motor.

8. The system of claim 7 wherein said motor is adapted to have a separately excited field winding, the system including a second power conditioning means interconnecting said field winding between said first and second source terminals and poled to supply electrical energy of a predetermined polarity to said field winding, said second conditioning means being responsive to a control signal for regulating the average magnitude of current in said field winding.

9. The system of claim 8 and including:
a. a second d-c electric traction motor operable in a motoring mode and in an electrical braking mode;
b. a third power conditioning means responsive to a command signal for regulating the average magnitude of current flowing in a predetermined forward direction therethrough, said second motor and said third power conditioning means being connected in parallel circuit arrangement with said first motor and said first power conditioning means, said switch means being responsive to said mode changing signals for selectively interconnecting said source terminals, the armature terminals of said second motor and said third power conditioning means in a manner identical to said interconnection of said source terminals, the armature terminals of said first motor and said first power conditioning means.

10. The system of claim 9 and including means for summing the electrical energy supplied by said first and second motors during said electrical braking mode when said average magnitude of voltage across said armature terminals exceeds the average magnitude of voltage across said source terminals.

11. The system of claim 10 wherein said summing means comprises a first unidirectional conducting means connected between a current output terminal of said first power conditioning means and said first source terminal through said switch means and a second unidirectional conducting means connected between a current output terminal of said second power conditioning means and said first source terminal through said switch means.

12. The system of claim 10 wherein said summing means comprises a first filter reactor connected between a current output terminal of said first power conditioning means and said first source terminal through said switch means and a second filter reactor connected between a current output terminal of said second power conditioning means and said first source terminal through said switch means.

13. The system of claim 10 wherein power input terminals of said first and second power conditioning means are connected to a common junction and said control signals are alternately supplied to said first and second power conditioning means whereby said power conditioning means are alternately conductive.

14. The system of claim 7 and including:
a. a controlled dynamic brake system connected in parallel circuit arrangement with said motor; and
b. control means responsive to the magnitude of voltage at said source terminals for energizing said brake system to provide an auxiliary current path for said electrical energy from said motor.

15. The system of claim 14 wherein said dynamic brake system comprises:
a. a first and a second controllable dynamic brake circuit, each comprising the combination of a power resistor and a controllable switching means connected in series circuit relationship, said first brake circuit being connected in parallel circuit arrangement with said power conditioning means and said second brake circuit being serially connected between said first brake circuit and said second source terminal; and
b. means for selectively energizing said controllable switching means whereby braking energy is dissipated in said power resistors.

16. The system of claim 15 wherein said means for energizing said switching means is effective during said braking mode when said power conditioning means is poled to permit electrical energy to be supplied from said motor to said source and when said average magnitude of voltage across said source terminals exceeds a first, lower reference voltage magnitude to energize said switching means in said second dynamic brake circuit and when said average magnitude of voltage across said source terminals exceeds a second, higher reference voltage to simultaneously energize said switching means in said first and second brake circuits.

17. The system of claim 16 wherein said means for energizing said switching means is effective during said braking mode when said power conditioning means is connected in parallel circuit arrangement with said motor and when said average magnitude of voltage across said source terminals exceeds said first, lower reference voltage magnitude to energize said switching means in said first brake circuit.

18. The system of claim 17 wherein said switching means comprises a thyristor.

19. The system of claim 9 and including:
a. a first controllable dynamic brake system connected in parallel circuit arrangement with said first motor;
b. a second controllable dynamic brake system connected in parallel circuit arrangement with said second motor; and
c. control means responsive to the magnitude of voltage at said source terminals for energizing said brake systems to provide auxiliary current paths for said electrical energy from said motors.

20. The system of claim 19 wherein each of said first and second dynamic brake systems each comprise:
a. a first and a second controllable dynamic brake circuit, each comprising the combination of a power resistor and a controllable switching means connected in series circuit relationship, said first brake circuit being connected in parallel circuit arrangement with said power conditioning means and said second brake circuit being serially connected between said first brake circuit and said second source terminal; and b. means for selectively energizing said controllable switching means whereby regenerative braking energy is dissipated in said power resistors.

21. The system of claim 20 wherein said means for energizing said switching means is effective during said braking mode when said power conditioning means is poled to permit electrical energy to be supplied from said motor to said source and when said average magnitude of voltage across said source terminals exceeds a first, lower reference voltage magnitude to energize said switching means in said second dynamic brake circuit and when said average magnitude of voltage across said source terminals exceeds a second, higher reference voltage to simultaneously energize said switching means in said first and second brake circuits.

22. The system of claim 21 wherein said means for energizing said switching means is effective during said braking mode when said power conditioning means is connected in parallel circuit arrangement with said motor and when said average magnitude of voltage across said source terminals exceeds said first, lower reference voltage magnitude to energize said switching means in said first brake circuit.

23. In a traction vehicle d-c electric traction motor power control system of the type including a d-c electric traction motor having armature means and field means, a power conditioning means responsive to a control signal for regulating the average magnitude of current flowing in a predetermined forward direction therethrough, filter means adapted for connection to a d-c power source having first and second output terminals for providing transient isolation between the power source and the motor, the improvement comprising switch means responsive to a mode changing signal for selectively interconnecting said source terminals, the armature terminals of said motor and said power conditioning means, said switch means including:

a. first means effective during said motoring mode for serially connecting said powering conditioning means and said motor between said source terminals with said power conditioning means poled to permit electrical energy to be supplied from said source to said motor;

b. second means effective during said braking mode and when the average magnitude of voltage across said armature terminals exceeds the average magnitude of voltage across said source terminals for serially connecting said power conditioning means and said motor between said source terminals with said power conditioning means poled to permit electrical energy to be supplied from said motor to said source; and c. third means effective during said braking mode and when the average magnitude of voltage across said armature terminals is less than the average magnitude of voltage across said source terminals for connecting said power conditioning means in parallel circuit arrangement with said motor between said source terminals with said power conditioning means poled to conduct current generated by said motor.

24. The system of claim 23 wherein said power conditioning means comprises a variable time ratio power control circuit adapted to be switched between conductive and non-conductive states in order to regulate the average magnitude of current in said motor, and including unidirectional conduction means connected in series circuit with said motor and poled to conduct motor generated current during the non-conductive state of said power control circuit.

25. The system of claim 24 wherein said filter means comprises an inductive reactance and a capacitive reactance, said inductive reactance serially interconnecting the first output terminal of the d-c power source and an input terminal of said first switch means and said capacitive reactance interconnecting an output terminal of said first switch means and the second output terminal of the d-c power source.

26. The system of claim 25 and including:

a. a controllable dynamic brake system connected in parallel circuit arrangement with said motor; and b. control means responsive to the magnitude of voltage at said source terminals for energizing said brake system to provide an auxiliary current path for said electrical energy from said motor.

27. The system of claim 26 wherein said dynamic brake system comprises:

a. a first and a second controllable dynamic brake circuit, each comprising the combination of a power resistor and a controllable switching means connected in series circuit relationship, said first brake circuit being connected in parallel circuit arrangement with said power conditioning means and said second brake circuit being serially connected between said first brake circuit and said second source terminal; and b. means for selectively energizing said controllable switching means whereby regenerative braking energy is dissipated in said power resistors.

28. The system of claim 27 wherein said means for energizing said switching means is effective during said braking mode when said power conditioning means is poled to permit electrical energy to be supplied from said motor to said source and when said average magnitude of voltage across said source terminals exceeds a first, lower reference voltage magnitude to energize said switching means in said second dynamic brake circuit and when said average magnitude of voltage across said source terminals exceeds a second, higher reference voltage to simultaneously energize said switching means in said first and second brake circuits.

29. The system of claim 28 wherein said means for energizing said switching means is effective during said braking mode when said power conditioning means is connected in parallel circuit arrangement with said motor and when said average magnitude of voltage across said source terminals exceeds said first, lower reference voltage magnitude to energize said switching means in said first brake circuit.

* * * * *

UNITED STATES PATENT AND TRADEMARK OFFICE
CERTIFICATE OF CORRECTION

PATENT NO. : 4,095,154
DATED : June 13, 1978
INVENTOR(S) : DF Williamson

It is certified that error appears in the above-identified patent and that said Letters Patent are hereby corrected as shown below:

Title Page, Column 1, delete Appl. No.: "744,591" and substitute -- 733,591 --

Signed and Sealed this

Nineteenth Day of December 1978

[SEAL]

Attest:

RUTH C. MASON
Attesting Officer

DONALD W. BANNER
Commissioner of Patents and Trademarks